United States Patent [19]

Drew

[11] Patent Number: 4,817,999
[45] Date of Patent: Apr. 4, 1989

[54] CONVERTIBLE HEADER LATCH MECHANISM

[75] Inventor: Dale M. Drew, Grosse Point Woods, Mich.

[73] Assignee: ASC, Incorporated, Southgate, Mich.

[21] Appl. No.: 100,544

[22] Filed: Sep. 24, 1987

[51] Int. Cl.$^4$ .............................................. E05C 5/02
[52] U.S. Cl. .............................. 292/113; 292/DIG. 5
[58] Field of Search .................. 292/113, DIG. 5, 66, 292/DIG. 49, 163, 247; 296/121, 180

[56] References Cited

U.S. PATENT DOCUMENTS

| | | | |
|---|---|---|---|
| 2,538,385 | 1/1951 | Schurman | 292/113 |
| 3,129,025 | 8/1962 | Krueger | 292/DIG. 5 X |
| 3,135,541 | 11/1962 | Kwasek | 292/64 |
| 3,216,763 | 3/1963 | Heincelman | 296/121 |
| 3,271,068 | 11/1964 | Collins, Jr. | 296/120 |
| 3,486,788 | 10/1967 | Benton | 296/120 |
| 3,712,665 | 1/1973 | Klein | 292/113 X |
| 3,806,174 | 4/1974 | Herman | 292/113 |

*Primary Examiner*—Richard E. Moore
*Attorney, Agent, or Firm*—Arnold S. Weintraub; William D. Blackman

[57] ABSTRACT

A latch mechanism for convertible vehicles, detaches from the header by a manually-applied, moderate, releasing force applied in the downward direction. This detachment is further enhanced by a unique mechanical linkage that employs cam action between the engaging member and the releasing member. The latch mechanism is mounted in the side-rail of the foldable top of a convertible vehicle. The latch mechanism includes a stationary member, a release member, and an engaging member. The stationary member has a pedestal and a foot extending from the pedestal. The engaging member has a keeper which attaches to the header, and a lip opposite the keeper. The release member is rotatably mounted to the stationary member and pivotally mounted to the engaging member. To detach the latch mechanism from the header, the release member is actuated by applying a disengaging force to the release member in a downward direction. The release member is swingably rotated relative to the stationary member as the lip on the engaging member is aligned with the foot of the stationary member. The engaging member is pivoted relative to the stationary member, resulting in a camming action between the lip and the foot, which causes the keeper to detach from the header in the extreme disengagement position.

8 Claims, 2 Drawing Sheets

CONVERTIBLE HEADER LATCH MECHANISM

BACKGROUND OF THE INVENTION

1. Technical Field

This invention relates to a latching mechanism for detaching a foldable convertible top from a vehicle header.

2. Background Art

The disengagement of the foldable top from the header in convertible vehicles has been a problem area. Such vehicles are generally marketed as being easy to convert from a covered top to an open top, but the detachment of the top all too often is a major undertaking requiring mechanical strength, thereby rendering such vehicles impractical for many would be purchasers. The art has sought to deal with the problem.

For example, Kwasek in U.S. Pat. No. 3,135,541 discloses a top latching mechanism including a latching member mounted within the windshield pillar. The mechanism has limited reciprocation and pivotal translation between a latch engaging retracted position and an extended latch disengaging position. After the top supporting rail is closed to the header, the latching member is actuated to its retracted position causing loading and locking engagement with a hook-shaped keeper carried within the top supporting rail.

Krueger in U.S. Pat. No. 3,129,025 discloses a convertible top header latch which includes a manual handle swingably mounted on a latch support member and connected to one of a pair of articulated links, and having a threaded hook-type latch bolt. A latch bolt assembly is pivotally mounted on the joint of the links for movement between the legs of the handle. One of the links and the handle form an overcenter type toggle linkage in the latched position of the bolt assembly.

Heincelman in U.S. Pat. No. 3,216,763 discloses a convertible header latch mechanism mounted within the side-rail of a top supporting frame. A side-rail supported bracket pivotally mounts a latch operating lever swingable between a latch disengaging position projecting laterally on the side rail member and a latch engaging position retracted within the confines of the mounting side rail.

Collins in U.S. Pat. No. 3,271,068 discloses a top latching mechanism having a header latch member secured to the upper end of a flexible latch supporting cable. The member can be shifted between an extended unlatched position and a retracted top locking position by the linear movement of the mounting cable.

Benton in U.S. Pat. No. 3,485,788 discloses a fastening device for foldable vehicle tops which includes a movable member having an elongated slotted portion for slidably receiving and retaining beaded end portions of the foldable top. A stationary member is attached to the vehicle frame above the windshield, providing another joint portion for securing the top on the frame along the front of the windshield.

Each of these prior art references recognize that a downward releasing force for a convertible top is preferred over a vertical or lateral torque, since the downward force can be readily applied by someone who is seated in the vehicle. In order to apply a vertical torque, the person usually must be leveraged relative to the plane of the torque. Likewise, lateral or horizontal latching can lead to jammed fingers and cumbersome positions.

A downward release is also preferred over a vertical torque, since such mechanisms are symmetrical. Hence, in those instances where the latch mechanisms are mounted one on the right-hand side of the top and another on the left-hand side of the top, the same mechanism can be used in both locations.

The present invention as is subsequently detailed, improves upon existing downward release latch systems, by providing a system which is inexpensive to machine, easy to assemble and repair, and less likely to fail.

SUMMARY OF THE INVENTION

This present invention provides a novel side-rail mounted latching mechanism for convertible vehicles, which detaches from the header by a manually-applied, moderate, releasing force applied in the downward direction.

The present invention includes a mechanical linkage that can be disengaged by the use of a cam action between the engaging member and the releasing member.

The latching mechanism of the present invention includes a stationary member, a release member, and an engaging member. The stationary member is mounted within the convertible top, and has a pedestal and a foot extending from the pedestal. The engaging member has a keeper which attaches to the header, and a lip opposite the keeper.

The release member has two side-struts. The release member is swingably mounted to the stationary member and pivotally mounted to the engaging member. The release member has a release arm, and the keeper is disengaged from the header by the application of a downward force to the release arm. This force extends the release member to an extreme disengaging position relative to the stationary member, and results in a camming action between the foot and the lip.

When the latch mechanism is in the latch engaging position, the stationary member rests between the side-struts. When the latch mechanism swings into the extreme disengaging position, the engaging member is positioned between the side-struts.

To detach the latch mechanism from the header, the release member is actuated by applying a disengaging force to the release member in a downward direction. The release member is swingably rotated relative to the stationary member as the lip on the engaging member is aligned with the foot of the stationary member. The engaging member is pivoted relative to the stationary member, resulting in a camming action between the lip and the foot, which causes the keeper to detach from the header in the extreme disengagement position.

The novel features which are believed to be characteristic of this latch mechanism will be better understood from the following drawings in which the presently preferred embodiments of the invention are illustrated by way of example. It is expressly understood, however, that the drawings are for purposes of illustration and description only, and are not intended as a definition of the limits of the invention.

DETAILED DESCRIPTION OF THE PREFERRED EMBODIMENT

Figure 1:
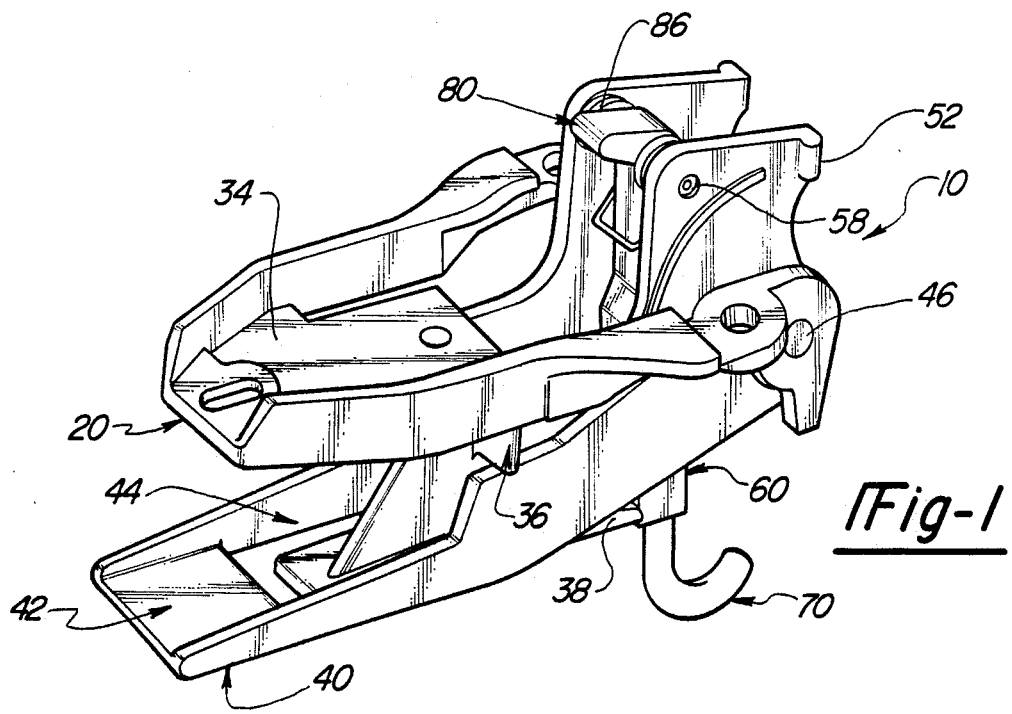
FIG. 1 is a perspective view of the preferred embodiment of the latch mechanism shown in the latch engagement position.

Referring now to the drawings, FIG. 1 is a perspective view of the latch mechanism 10, when it is fully engaged and attached to a vehicle header (not shown) which is mounted in the vehicle frame.

Latch mechanism 10 is mounted in the foldable top of a convertible vehicle, the top being made of a suitable fabric or plastic sheet material. Preferably, the top contains two latch mechanisms 10, one located on each side thereof. As is known to those skilled in the art, such convertible tops generally include a plurality of crossbows interconnected to pivotally movable side rails which extend longitudinally on the vehicle. The present latch system is specifically adapted for mounting on a side rail, and, generally, between the parallel side walls of the side rail. since each latch member is identical for facilitating the description hereof, only one such member will be described. The latch mechanism 10 comprises a stationary member 20, which is mounted in the side-rail (not shown) of a convertible top, and has an integral pedestal 30 with a flat bottom. The flat bottom is coplanar with the bottom of the side rail to which the latch is mounted. The member 20, also includes an upper frame 34 and a plurality of holes machined therein for attachment to the side rail by a series of fasteners (not shown). Extending from pedestal 30 is an integral foot portion 38.

Latch mechanism 10, also comprises a release member 40 which is attached to stationary member 20 through a pin mounting 46, which enables a swingable rotation of member 40 relative to member 20. The pin mounting 46 preferably is spring-biased relative to member 40 at an acute angle relative to pedestal 30, via a spring 86 to normally urge release member 40 toward the vehicle header. When latch mechanism 10 is in the latch engaging position shown in FIG. 1, engage stop 36, which is integral to stationary member 20, stops release member 40.

Release member 40 has an arm 42 which is manually operated by a passenger who grasps it with one or more fingers and exerts pressure in a downward direction to actuate disengagement of the convertible top from the header. In its normal position, release member 40 envelopes pedestal 30 and is substantially coplanar therewith.

Release member 40 has two side-struts 44, one on each side thereof which enable member 40 to swing freely of stationary member 20, and engaging member 60. When latch mechanism 10 is in the extreme latching position shown in FIG. 1, pedestal 30 rests between side-struts 44.

Engaging member 60 has a threaded, hook-shaped keeper 70, which is fastened into member 60. When in the position shown in FIG. 1, bolt 70 engages the header, and engaging member 60 rests against foot portion 38.

Figure 2:
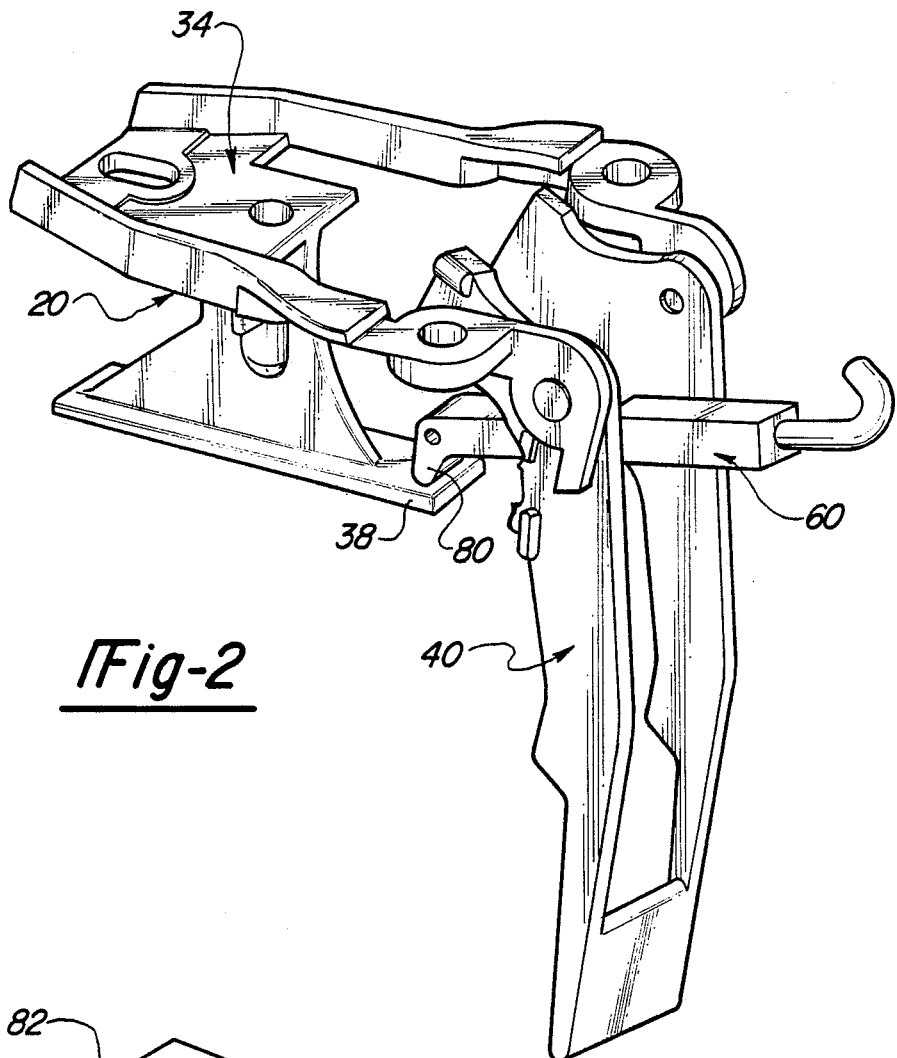
FIG. 2 is a perspective view of the same embodiment of the latch mechanism shown in FIG. 1, in the intermediate disengaging position.

Latch mechanism 10 rotates into the intermediate disengaging position shown in FIG. 2 as a downward force is applied to release arm 42. Release member 40 swings in a rotational manner downward relative to stationary member 20, causing engaging member 60 to pivot. As release member 40 and engaging member 60 rotate forward into the position shown in FIG. 2, the center of gravity of latch mechanism 10 also moves forward. At the precise point of contact between lip portion 80 and foot portion 38, a cam action results as foot 38 causes lip 80 to pivot downward about a pivot mounting 58, thereby causing hook-shaped keeper 70 to become slidably detached from the header. This forward repositioning of the center of gravity lessens the amount of downward force that need be applied to release member 40 to ensure disengagement.

Figure 3:
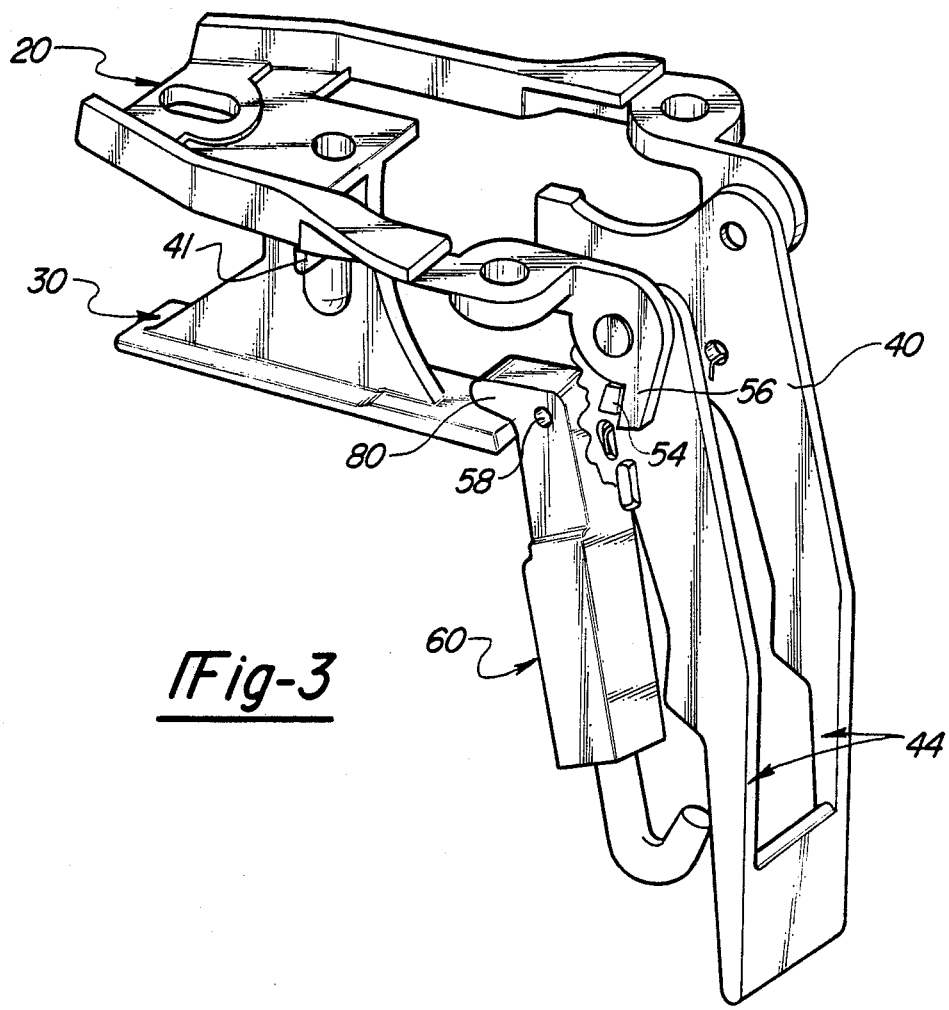
FIG. 3 is a perspective view of the same embodiment of the latch mechanism shown in FIG. 1 and FIG. 2, in the extreme disengaging position.

The cam action results in engaging member 60 swingably rotating between side-struts 44, as latch mechanism 10 rotates into the extreme disengaging position shown in FIG. 3. The further rotation of release member 40 relative to stationary member 20 is prevented by a lateral, protruding disengage stop 54 located on engaging member 60, which cooperates with a protruding pin finger 56 mounted on stationary member 20, the radial position of which is predetermined to coincide with the extreme disengaging position. Latch mechanism 10 may then be reengaged to the header by returning mechanism 10 to the latch engaging position shown in FIG. 1 and urging hook-shaped keeper 70 about the header.

Figure 4:
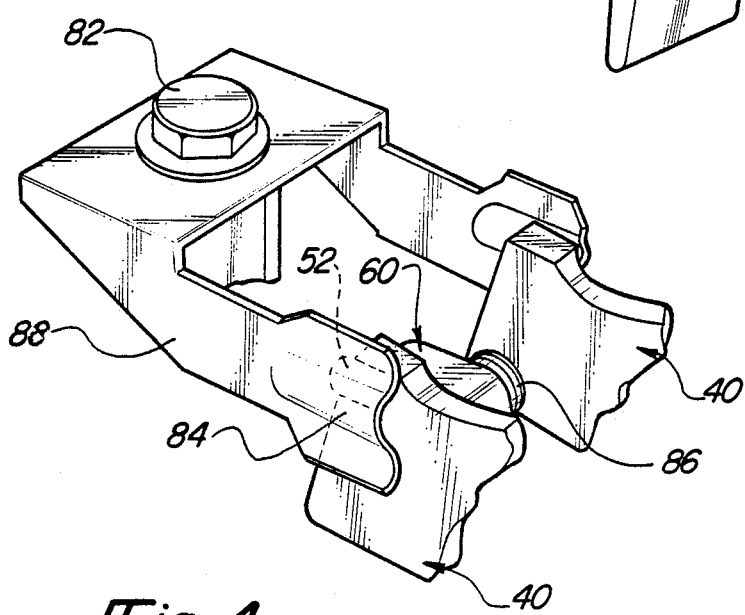
FIG. 4 is an exploded view, showing the interaction between a clamp and the engaging member, the latch mechanism being in the extreme disengaging position depicted in FIG. 3.

FIG. 4 is an exploded view, showing latch mechanism 10 in the extreme disengaging position depicted in FIG. 3. A U-shaped clamp 88 is mounted on stationary member 20 by a fastener 82. The corrugated flanges 84 of clamp 80 are predesigned to cooperate with nose 52 of release member 40 during disengagment, when release member 40 swingably rotates so that nose 52 is positioned between corrugated flanges 84.

While the invention has been described in conjunction with specific embodiments, it is evident that many variations will be apparent to those skilled in the art in light of the disclosure herein. It is intended that all such variations are included herein that fall within the spirit and scope of the appended claims.

I claim:

1. A latch mechanism for a convertible vehicle having a foldable top and a header, the mechanism having a latch engaging position when fully engaged, and an extreme disengaging position when disengaged, which comprises:

a stationary member being mounted within a convertible top, the member having a pedestal depending therefrom, and a foot extending from the pedestal;

an engaging member having a keeper which attaches to a header, the engaging member having a lip adjacent the end thereof opposite the keeper and disposed in an opposite direction from the keeper; and a release member having two side-struts integrally formed at the sides thereof, the release member being swingably mounted to the stationary member and being pivotally mounted to the engaging member adjacent the lip enabling the release member to swing downward relative to the stationary member resulting in a camming action between the foot and the lip when a downward force is applied to the release arm which thereby detaches the keeper from the header.

2. The latching mechanism of claim 1, wherein the stationary member is positioned between the side-struts when the mechanism is in the latch engaging position, 3. The latching mechanism of claim 1, wherein the engaging member is positioned between the side-struts when the mechanism is in the extreme disengaging position.

4. A latch mechanism for a convertible vehicle having a foldable top and a header, the mechanism having a latch engaging position when fully engaged, and an extreme disengaging position when disengaged, which comprises:

a stationary member being mounted within a convertible top, the member having a pedestal depending therefrom, and a foot extending from the pedestal;

an engaging member having a keeper which attaches to a header, the engaging member having a lip adjacent the end thereof opposite the keeper and disposed in an opposite direction from the keeper; and a release member having two side-struts integrally formed at the sides thereof, the release member being swingably mounted to the stationary member and pivotally mounted to the engaging member adjacent the lip, the release member having a release arm interconnecting the side-struts at the ends thereof opposite the point of mounting of the release member to the stationary member, the stationary member being positioned between the side-struts when the mechanism is in the latch engaging position, and the engaging member being positioned between the side-struts when the mechanism is in the extreme disengaging position.

5. The latching mechanism of claim 4, wherein the release member swings downward relative to the stationary member detaching the keeper from the header, when a disengaging downward force is applied to the release arm.

6. The latching mechanism of claim 4, wherein a downward force applied to the release arm actuates a camming action between the foot and the lip which causes the keeper to be detached from the header.

7. A method for disengaging a latch mechanism from the header in a vehicle convertible, the latch mechanism having a latch engaging position when fully engaged, and an extreme disengaging position when disengaged, which comprises:

actuating a release member of the latch mechanism while the latch mechanism is in the latch engaging position, by applying a disengaging force to the release member in a downward direction, thereby causing the release member to swing relative to a stationary member which is mounted in a convertible top, the stationary member having a pedestal and a foot extending therefrom, and the release member having two side-struts;

aligning a lip on an engaging member with the foot, the engaging member having a keeper opposite the lip; and pivoting the engaging member relative to the stationary member, resulting in a camming action between the lip and the foot, which causes the keeper to detach from the header in the extreme disengagement position.

8. The method described in claim 7, further comprising:

moving the center of gravity of the latch mechanism in the same direction as the movement of the release arm as the lip on the engaging member is aligned with the foot.

* * * * *